United States Patent
Yoshida et al.

(10) Patent No.: US 7,331,739 B2
(45) Date of Patent: Feb. 19, 2008

(54) METHOD FOR MACHINING WORKPIECE

(75) Inventors: Jun Yoshida, Kanagawa (JP); Akira Kawana, Kanagawa (JP); Yasuhiro Kurahashi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 206 days.

(21) Appl. No.: 10/538,148

(22) PCT Filed: Aug. 12, 2004

(86) PCT No.: PCT/JP2004/011855

§ 371 (c)(1),
(2), (4) Date: Jun. 8, 2005

(87) PCT Pub. No.: WO2006/016420

PCT Pub. Date: Feb. 16, 2006

(65) Prior Publication Data

US 2006/0251484 A1    Nov. 9, 2006

(51) Int. Cl.
*B23Q 15/28* (2006.01)
*B23Q 15/16* (2006.01)
*B23Q 17/22* (2006.01)
*B23Q 17/09* (2006.01)
*G05B 19/404* (2006.01)

(52) U.S. Cl. .................. 409/131; 409/84; 700/175
(58) Field of Classification Search .............. 409/131, 409/80, 84, 186, 192; 700/175; 415/14, 415/148
See application file for complete search history.

(56) References Cited

U.S. PATENT DOCUMENTS

| | | | | |
|---|---|---|---|---|
| 3,834,615 A | * | 9/1974 | Watanabe et al. | 700/175 |
| 4,176,396 A | * | 11/1979 | Howatt | 700/175 |
| 4,186,529 A | | 2/1980 | Huffman | |
| 4,514,797 A | * | 4/1985 | Begin | 700/175 |
| 4,802,095 A | * | 1/1989 | Jeppsson | 700/175 |
| 5,247,452 A | * | 9/1993 | Ueda et al. | 700/175 |
| 5,506,786 A | * | 4/1996 | Itoh et al. | 700/175 |
| 5,568,028 A | * | 10/1996 | Uchiyama et al. | 700/175 |
| 5,796,618 A | * | 8/1998 | Maeda et al. | 700/175 |

(Continued)

FOREIGN PATENT DOCUMENTS

DE    101 27 972 C1    7/2002

(Continued)

*Primary Examiner*—Dana Ross
(74) *Attorney, Agent, or Firm*—Paul & Paul (57) ABSTRACT

A wear amount of a working tool T during the machining of a workpiece is estimated during the machining, and a positional command generated in accordance with a predetermined machining program is sequentially corrected during the machining based on the estimated wear amount of the working tool T. The workpiece W is machined in accordance with the corrected positional command. Also, the wear amount of the working tool T upon the interruption of the machining operation is calculated, and the positional command generated in accordance with the predetermined machining program is corrected based on the calculated wear amount of the working tool so that a tool edge position of the working tool T upon the interruption of the machining operation coincides with the tool edge position of the working tool T upon the restart of the machining operation when the machining operation is restarted at a position where the machining operation has been interrupted. The workpiece is machined in accordance with the corrected positional command.

13 Claims, 5 Drawing Sheets

U.S. PATENT DOCUMENTS

| | | | | |
|---|---|---|---|---|
| 5,871,391 A | * | 2/1999 | Pryor | 700/175 |
| 6,041,271 A | * | 3/2000 | Lindstrom | 700/175 |
| 6,161,055 A | * | 12/2000 | Pryor | 700/175 |
| 6,449,526 B1 | | 9/2002 | Sachs et al. | |
| 7,101,126 B2 | * | 9/2006 | Kakino et al. | 409/84 |

FOREIGN PATENT DOCUMENTS

| | | |
|---|---|---|
| EP | 0 509 817 A1 | 10/1992 |
| EP | 1 027 954 A1 | 8/2000 |
| EP | 1 407 853 A1 | 4/2004 |
| JP | 0118252 | 7/1989 |
| JP | A-188252 | 7/1989 |
| JP | A-2-59253 | 2/1990 |
| JP | 06143093 | 5/1994 |
| JP | A-6-143093 | 5/1994 |
| WO | WO 2005/023486 A | 3/2005 |

* cited by examiner

METHOD FOR MACHINING WORKPIECE

TECHNICAL FIELD

The present invention relates to a method for machining a workpiece, while taking a wear amount of a working tool, and to a machine tool having a function for compensating for a wear amount of a working tool.

BACKGROUND ART

In an NC machining tool, a workpiece placed on a table is machined by moving a working tool, mounted to a spindle, and the workpiece relative to each other in accordance with a desirable machining program, whereby a shape of the workpiece obtained by the machining is determined by the trajectory of the working tool. Generally, the machining program is prepared on the premise that the working tool is not worn and maintains a constant length during the machining.

Figure 5:
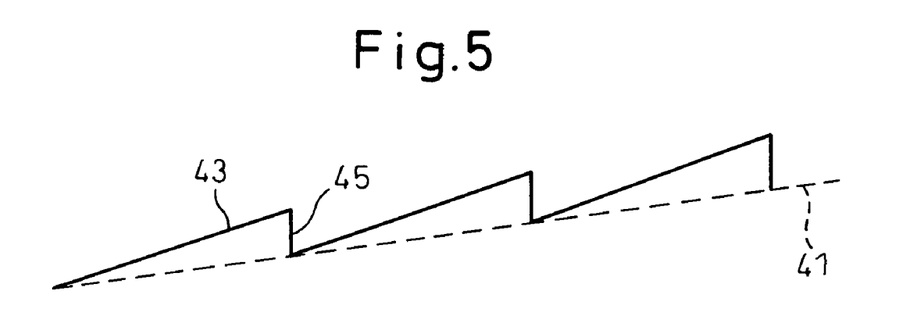
FIG. 5 is a diagram illustrating the level difference generated at a working tool replacement position on the machined profile in the prior art.

However, in practice, as the machining operation progresses, the working tool wears to shorten its length. Accordingly, as shown, for example, in FIG. 5, when the desired profile 41 of the workpiece is slanted upwards from left to right, the actually machined profile (i.e., machining trajectory) 43 is gradually shifted upward (i.e., toward the spindle) from the desired profile (i.e., machining trajectory) 41 to result in the deviation. Accordingly, the desirable machined profile 41 cannot be obtained.

Further, when the working tool is worn, the working tool is replaced with a new one by detecting the working tool life in a manner as described, for example, in Japanese Unexamined Patent Publication Nos. 54-35485 or 2001-150299. That is, the machining operation is interrupted and, after the worn working tool has been replaced with the new one having a standard length, the machining operation starts again. However, in such a case, if the new working tool is returned to a command position in accordance with the machining program, an actual position of the edge of the new working tool is shifted to lower than that of the old working tool by the wear amount thereof because the new working tool is not yet worn. Similarly, in the case that a working tool which is being used for machining a first area interrupts its machining operation and starts again after carrying out the machining of a second area different from the first area, the wear amount of the working tool after starting again the machining operation in the first area has changed from that before interrupting the machining operation in the first area. Therefore, when the working tool is restored to the command position at which the machining operation in the first area has been interrupted, the actual position of the edge of the working tool after starting again the machining operation in the first area changes from that before interrupting the machining operation in the first area. As a result, there is an inconvenience in that the level difference 45 (see FIG. 5) is generated on the machined profile between before and after the replacement of the working tool or the interruption of the machining operation in the purpose of machining different areas. In a case shown in FIG. 5, as the working tool is replaced three times, there are three level differences 45 in the machined profile.

DISCLOSURE OF THE INVENTION

Therefore, an object of the present invention is, in order to eliminate the problems inherent to the prior art caused by the wear of a working tool, to provide a machining method and a machine tool provided with a function for compensating for the wear of a working tool, by which a resultant machined profile having a smaller deviation from the desirable machined profile can be obtained.

Another object of the present invention is to provide a machining method and a machine tool provided with a function for correcting the wear of a working tool, by which a smooth machined profile having no level difference caused by the tool replacement can be obtained.

In order to achieve the above objects, according to the present invention, a wear amount of a working tool upon the completion of the machining operation is detected, and a tool edge position of the working tool upon the start of the next machining operation is set to coincide with a tool edge position of the working tool upon the completion of the preceding machining operation, based on the detected wear amount of the working tool, to thereby continue the machining operation.

According to a first aspect of the present invention, there is provided a method for machining a workpiece by moving a working tool and the workpiece relative to each other, which includes steps of: generating a positional command based on a predetermined NC machining program; carrying out the machining operation for the workpiece in accordance with the generated positional command; interrupting the machining operation for the workpiece; detecting a wear amount of the working tool upon the interruption of the machining operation for the workpiece; and setting a tool edge position of the working tool upon the restart of the machining operation for the workpiece to coincide with the tool edge position of the working tool upon the interruption of the machining operation for the workpiece, based on the detected wear amount of the working tool, and restarting the machining operation for the workpiece from the set tool edge position of the working tool.

According to a second aspect of the present invention, there is provided a method for machining a workpiece by moving a working tool and the workpiece relative to each other, which includes steps of: generating a positional command based on a predetermined NC machining program; carrying out the machining operation for the workpiece in accordance with the generated positional command; sequentially estimating a wear amount of the working tool during the machining of the workpiece; sequentially correcting the tool edge position of the working tool so as to compensate for the estimated wear amount of the working tool; interrupting the machining operation for the workpiece; detecting the wear amount of the working tool upon the interruption of the machining operation for the workpiece; accumulating a difference between the detected wear amount of the working tool and the estimated wear amount of the working tool; and setting a tool edge position of the working tool upon the restart of the machining operation so as to coincide with the tool edge position of the working tool upon the interruption of the machining operation for the workpiece, based on the accumulated wear amount of the working tool, and restarting the machining operation for the workpiece from the set tool edge position of the working tool.

According to a third aspect of the present invention, there is provided a machine tool for machining a workpiece by moving a working tool and the workpiece relative to each other and having a function for correcting the wear of the working tool, which includes a positional command generating means for generating a positional command based on a predetermined NC machining program and moving the working tool and the workpiece relative to each other in accordance with the generated positional command; a tool wear amount detection means for detecting a wear amount of the working tool upon the interruption of the machining operation for the workpiece; and a tool edge position control means for setting a tool edge position of the working tool upon the restart of the machining operation for the workpiece so as to coincide with the tool edge position of the working tool upon the interruption of the machining operation for the workpiece, based on the wear amount of the working tool detected by the tool wear amount detection means.

According to a fourth aspect of the present invention, there is provided a machine tool for machining a workpiece by moving a working tool and the workpiece relative to each other and having a function for correcting the wear of the working tool, which includes a positional command generating means for generating a positional command based on a predetermined NC machining program and moving the working tool and the workpiece relative to each other in accordance with the generated positional command; a tool wear amount detection means for detecting a wear amount of the working tool upon the interruption of the machining operation for the workpiece; a tool wear amount estimation means for sequentially estimating a wear amount of the working tool during the machining of the workpiece; a tool edge position correction means for sequentially correcting the tool edge position of the working tool to compensate for the wear amount of the working tool estimated by the tool wear amount estimation means; a wear amount accumulation means for accumulating a difference between the detected wear amount of the working tool and the estimated wear amount of the working tool; and a tool edge position control means for setting a tool edge position of the working tool upon the restart of the machining operation for the workpiece so as to coincide with the tool edge position of the working tool upon the interruption of the machining operation for the workpiece, based on the accumulated wear amount of the working tool.

In the present invention, the wear amount of the working tool worn by the machining operation is detected, and the tool edge positions of the working tool before and after the interruption of the machining operation are made to coincide with each other based on the detected wear amount. Therefore, it is possible to carry out the machining operation without generating any level difference. Further, if the step of sequentially correcting the tool edge position of the working tool in real time so as to compensate for the wear amount of the working tool estimated during the machining is combined with the former, the deviation of the actual machined profile from the desirable machined profile can be reduced or estimated.

BRIEF DESCRIPTION OF THE DRAWINGS

The above-mentioned objects and other objects, features and advantages of the present invention will be described below in more detail with reference to the attached drawings, wherein.

BEST MODE FOR CARRYING OUT THE INVENTION

An embodiment of the present invention will be described with reference to the drawings. In this regard, in the following description, a "desirable machined profile" means a desired profile of a workpiece after being machined; an "actual machined profile" means a profile of the actual workpiece obtained by the machining operation; a "reference machining program" means a machining program prepared so that the desirable machined profile can be obtained on the premise that the working tool T would not be worn during the machining operation and maintains a constant length; and a "modified machining program" means a program obtained by modifying the reference machining program in consideration of the deviation caused by the wear of the working tool T between the desirable machined profile and the actual machined profile.

First, a main part of a configuration of an NC machine tool 11, provided with a function for correcting the wear of a working tool according to the present invention, will be described with reference to FIG. 1. A main body of the NC machine tool 11 includes a spindle 15 rotatably supported by a spindle head 13 and a table 17 for mounting and fixing a workpiece W thereon, so that the spindle 13 and the table 17 can be relatively moved in three directions along X-, Y- and Z-axes orthogonal to each other by means of an X-axis feed motor 21, a Y-axis feed motor (not shown) and a Z-axis feed motor 23 in accordance with the axial motion command from an NC device 19.

Figure 1:
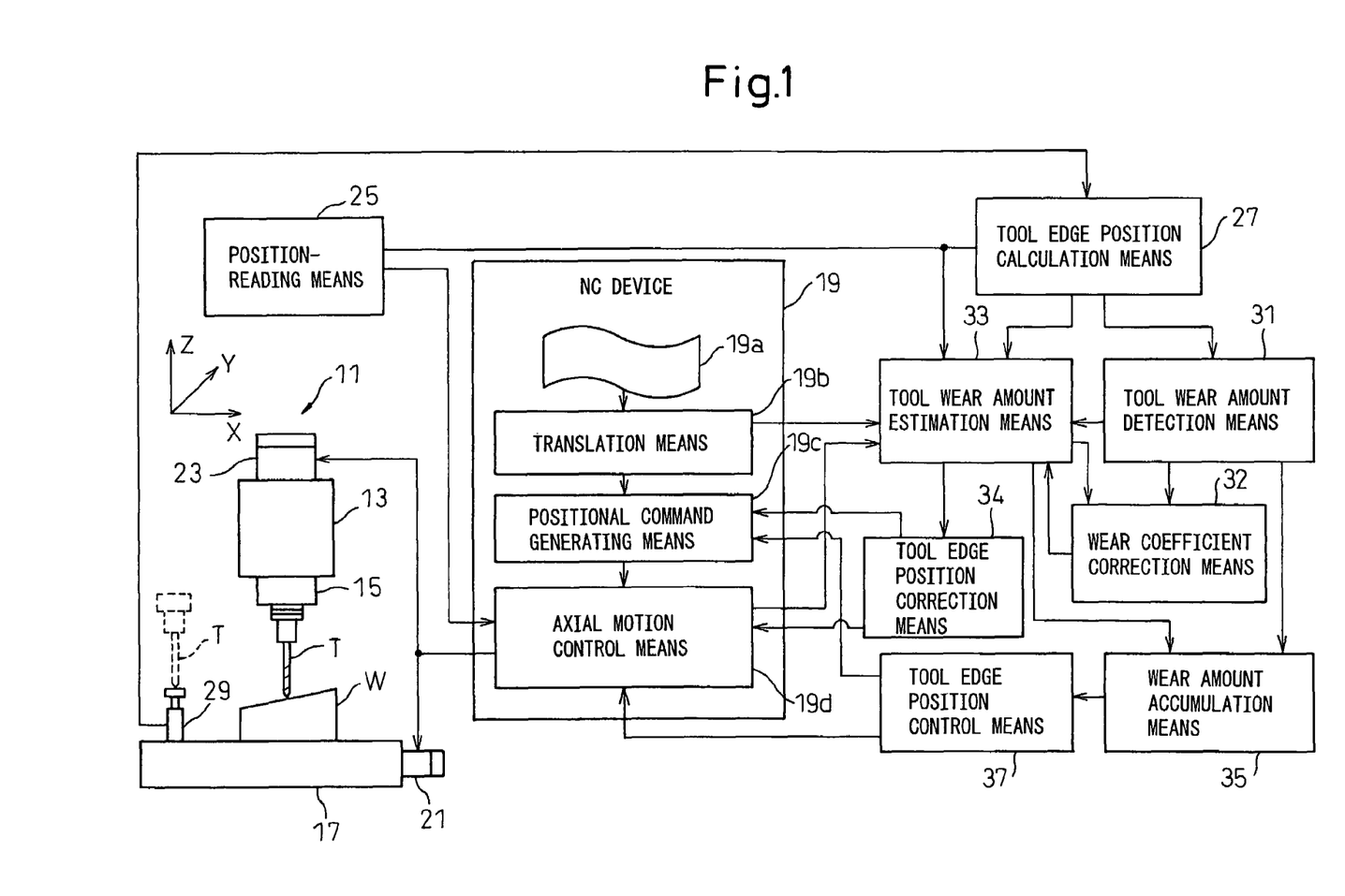
FIG. 1 is a block diagram illustrating a configuration of a main part of an NC machine tool according to the present invention.

In the NC machine tool 11 of FIG. 1, the table 17 is made to move by the X-axis feed motor 21 in the X-axis direction, and the spindle 15 is made to move by the Y-axis feed motor and the Z-axis motor 23 in the Y-axis direction and the Z-axis direction, so that the spindle 15 and the table 17 are made to move in directions, along the three axes, orthogonal to each other. However, the NC machine tool 11 may have an alternative configuration, for example, a configuration in which the spindle 15 is made to move in the directions along the three axes orthogonal to each other by the X-axis feed motor 21, the Y-axis feed motor and the Z-axis feed motor 23. It should be noted that the X-axis and the Y-axis indicate two axes orthogonal to each other in a plane vertical to the rotation axis of the spindle 15, respectively, and the Z-axis indicates an axis parallel to the rotation axis of the spindle 15.

Further, the working tool T is mounted to a distal end of the spindle 13, and the workpiece is machined into a desirable profile by making the rotating working tool T slightly cut into the workpiece W and moving the spindle 15 and the table 17 relative to each other so that the working tool T and the workpiece W are moved in the directions along X-, Y- and Z-axes relative to each other.

The NC device 19 includes a program storage means 19a for storing various programs such as a machining program or a tool edge position measuring program, a translation means 19b for translating the program stored in the program storage means 19a, a positional command generating means 19c for generating positional commands for the spindle 15 and the table 17 in accordance with the translated program, and an axial motion control means 19d such as a servo motor driver for driving the X-axis feed motor 21, the Y-axis feed motor and the Z-axis feed motor 23 in accordance with the positional commands.

In the main body of the NC machine tool 11, position-reading means 25 is provided for reading coordinates values of the respective X-, Y- and Z-feed axes at any moment, so that the relative position of the spindle 15 relative to the table 17 read by the position-reading means 25 are sequentially fed back to the axial motion control means 19d. A suitable device used for the position-reading means 25 includes digital scales attached to the respective feed shafts of the spindle 15 or the table 17, and encoders attached to the respective X-axis feed motor 21, the Y-axis feed motor and the Z-axis feed motor 23.

Further, the NC machine tool 11 is provided with tool edge position calculation means 27 for obtaining an edge position of the working tool T relative to the spindle 15, preferably a distance between a front end surface of the spindle 15 and the edge position of the working tool T, i.e., a length of the working tool.

For example, the tool edge position calculation means 27 moves the spindle 15 and the table 17 move relative to each other and causes an tool edge detection device 29, provided on the table 17 at a position not disturbing the machining operation, to detect the edge of the working tool T mounted to the spindle 15, thereby computing the edge position of the working tool T relative to the spindle 15 from the position of the spindle 15 relative to the table 17 detected at this time by the position-reading means 25. More specifically, since an edge detecting position of the tool edge detection device 29 relative to the table 17 is predetermined, it is possible to calculate the tool edge position of the working tool T relative to the spindle 15 by utilizing a fact that, if the positions of the spindle 15 and the table 17 are detected, a distance between the spindle 15 and the edge detecting position of the edge detection device 29 is ascertained. The tool edge detection device 29 may be a contact type sensor as shown in FIG. 1 or may be a non-contact type sensor such as a laser type, a capacitance type or an eddy current type of sensor.

A method by which the tool edge position calculation means 27 calculates the tool edge position of the working tool W relative to the spindle 15 is not limited to the above-mentioned one, but the tool edge position calculation means 27 may, of course, calculate the tool edge position of the working tool T relative to the spindle 15 by using another suitable method.

In the above-mentioned NC machine tool 11, the machining operation is generally carried out in accordance with a reference program which is prepared on the premise that the working tool T would not be worn during the machining operation and maintains a constant length. Accordingly, as the working tool T wears, the tool edge position of the working tool T gradually approaches from the surface line of the workpiece of the desirable machined profile toward the spindle 15, whereby the actual machined profile is shifted from the desirable machined profile. Also, when the working tool T is replaced with a new one, at this time, even if the spindle 15 is disposed at the same position, the tool edge position of the working tool T is closer to the table 17. Therefore, a level difference is generated on the surface of the workpiece of the actually machined profile.

To solve such a problem, the NC machine tool 11 according to the present invention is further provided with a tool wear amount detection means 31, a wear coefficient correction means 32, a tool wear amount estimation means 33, an tool edge position correction means 34, a wear amount accumulation means 35, and a tool edge position control means 37, so that the machining operation can be carried out in consideration of the change in the length or tool edge position of the working tool T due to the wear.

The tool wear amount detection means 31 calculates and detects the wear amount of the working tool T, from the difference in the edge position of the working tool T between before and after the machining operation in a certain area, or from the difference between the tool edge position of the working tool T before the present machining operation, defined as that after the preceding machining operation, and the tool edge position of the working tool T after the present machining operation.

On the other hand, the tool wear amount estimation means 33 estimates the wear amount of the working tool T during the machining operation, based on the cutting condition, the machining load, the cutting length CL or others. For example, the tool wear amount estimation means 33 in advance memories a wear coefficient Mk representing the tool wear amount per unit cutting length, and sequentially obtains the wear amount of the working tool T during the machining operation, based on a product of the cutting length and the wearing coefficient Mk of the working tool T being used for the machining. Also, the tool wear amount estimation means 33 can estimate a total wear amount of the working tool T during the machining operation by sequentially adding the obtained wear amount values. It should be noted that the cutting length CL means a length along which the workpiece W has been machined by the cutting.

Based on the wear amount of the working tool T estimated by the tool wear amount estimation means 33, the tool edge position correction means 34 sequentially transmits signals for compensating the estimated wear amount to the positional command generating means 19c or the axial motion control means 19d, so that the machining operation free from the error due to the wear is carried out.

To more accurately determine the wear coefficient Mk used for the estimation, the wear coefficient correction means 32 is provided for comparing the wear amount of the working tool T detected by the tool wear amount detection means 31 with the wear amount of the working tool T estimated by the tool wear amount estimation means 33 and sequentially correcting the wear coefficient Mk so that both the wear amounts coincide with each other.

The wear amount accumulation means 35 adds the wear amount of the working tool T detected by the tool wear amount detection means 31 whenever the machining operation has interrupted due to, for example, the replacement of the working tool T, to thereby obtain a deviation, i.e. error, of the actually machined profile from the desirable machined profile defined by the reference machining program, at the time of interrupting the machining operation.

The edge position control means 37 changes the relative position of the spindle 15 relative to the table 17 by the wear amount of the working tool T obtained from the tool wear amount detection means 31. This change in the relative position is achieved by transmitting the signal from the edge position control means 37 to the positional command generating means 19c or the axial motion control means 19d. In such a manner, by making those tool edge positions of the working tool T to coincide with each other between before and after the interruption of the machining operation, it is possible to eliminate or reduce the effect of the wear of the working tool T on the actually machined profile.

For example, when the length or the wear amount of the working tool T uncontinuously changes due to the replacement thereof or others, the positional command generated by the positional command generating means 19c in accordance with the reference machining program is corrected to shift the spindle 15 and the table 17 away from each other after the replacement of the working tool T by the accumulated wear amounts of the working tool T obtained by the tool wear amount detection means 31, i.e., by the error obtained by the wear amount accumulation means 35 between the desirable machined profile and the actually machined profile. Thus, the tool edge position of the working tool T relative to the workpiece W before the replacement of the working tool T corresponds that after the replacement of the working tool T to thereby eliminate the level difference otherwise generated on the actually machined profile due to the wear amount.

When the tool length continuously changes due to the wear, the positional command generated by the positional command generating means 19c in accordance with the reference machining program is corrected to sequentially shift the spindle 15 and the table 17 toward each other by the wear amount of the working tool T obtained by the tool wear amount estimation means 33. Thus, the change in the length of the working tool T due to the wear thereof is offset or compensated so that the tool edge position of the working tool T relative to the workpiece W moves along the desirable machined profile to eliminate or reduce the deviation of the actually machined profile from the desirable machined profile due to the wear of the working tool T.

In this regard, the correction of the positional command could be made by either one of the offset correction of the working tool, the correction of the coordinates system for the workpiece and the correction of the machine origin of the NC machine tool 11.

Next, the operation of the NC machine tool 11 shown in FIG. 1 will be described with reference to FIGS. 2 to 5.

Figure 2:
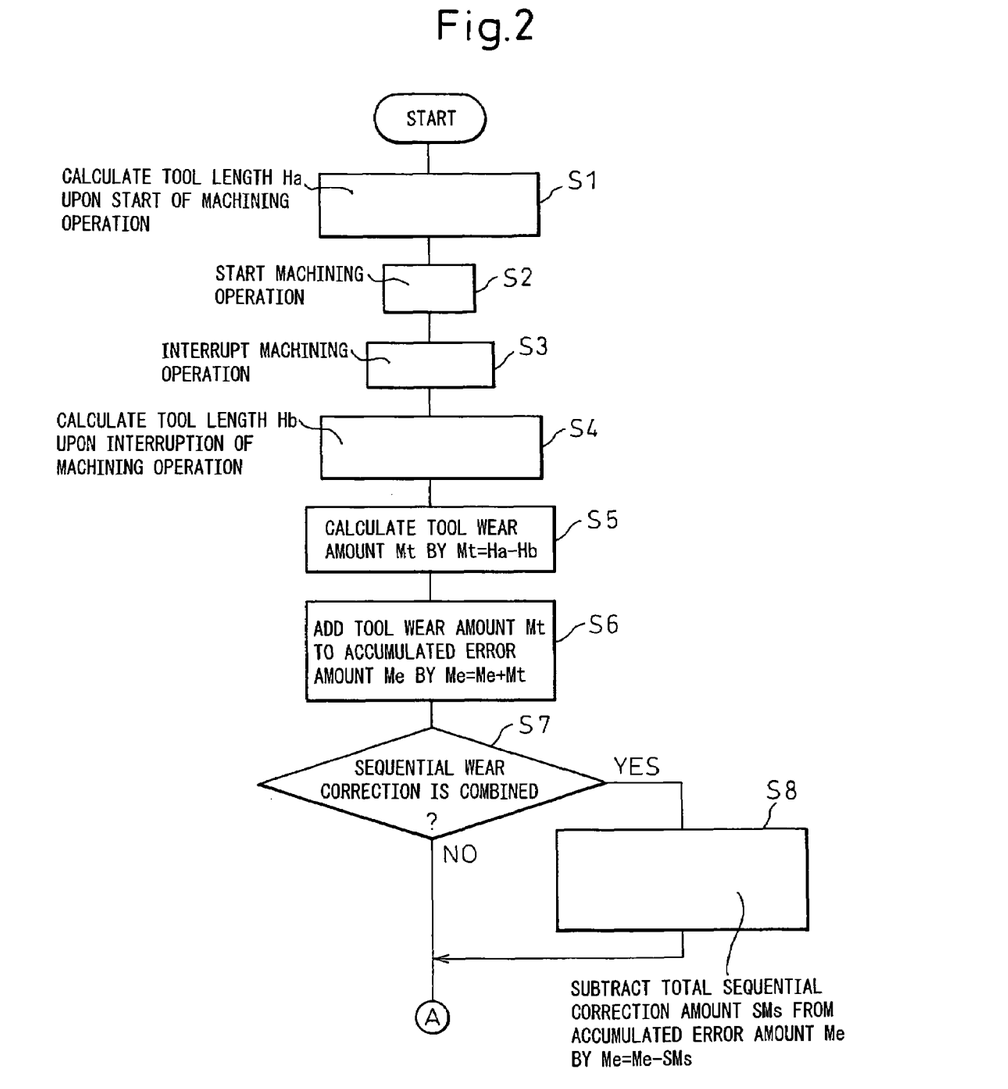
FIG. 2 is a flow chart illustrating the steps of the machining operation carried out in the machine tool shown in FIG. 1 for preventing the level difference from being generated on the profile of the actually machined workpiece.

Prior to the machining operation, an operator sets up the machining program and stores the same in the program storage means 19a. While the reference machining program prepared on the premise that no wear occurs in the working tool T, in this example, is stored in the program storage means 19a as a machining program, the modified machining program, which is prepared in consideration of the wear of the working tool T, may be stored in the program storage means 19.

Then, the NC machine tool 11 calculates, by means of the tool edge position calculation means 27, the relative tool edge position of the working tool T relative to the spindle 15, regarding the working tool T mounted to the spindle 15 upon the start of the machining operation (step S1). To simplify the description, it is assumed that the tool edge position of the working tool T relative to the front end surface of the spindle 15, i.e. a tool length Ha, is calculated at step S1. Also, to simplify the description, it is assumed that a working tool T having the same standard length will be used after the replacement of the preceding working tool T at the following steps. However, the following steps are not limited to the working tools T having the same length, but, of course, may be applicable to working tools T having different lengths.

When the calculation of the tool length Ha has been completed, the translation means 19b translates the reference machining program stored in the program storage means 19a. In accordance with the translated reference machining program, the positional command generating means 19c generates the positional commands for the spindle 15 and the table 17, and the axial motion control means 19d drives the X-axis feed motor 21, the Y-axis feed motor and the Z-axis feed motor 23 to thereby carry out the machining operation (step S2).

Next, the machining operation is interrupted at a predetermined timing for the purpose of the replacement of the working tool T, and the relative position of the shaft 15 to the table 17 upon the interruption is obtained on the X-axis, Y-axis and Z-axis (step S3). The relative position of the spindle 15 to the table 17 may be obtained from the positional command for the spindle 15 and the table 17 generated by the positional command generating means 19c. The values detected by the position-reading means 25 may be used as the positions of the spindle 15 and the table 17 on the X-axis, Y-axis and Z-axis.

Next, prior to the replacement of the working tool T, the tool length Hb of the working tool T is calculated by the tool edge position calculation means 27 (step S4). Instead of step S3, the tool length may be calculated by the tool edge position calculation means 27 at a suitable time, and the machining operation may be interrupted when the tool length becomes shorter than a predetermined value. In this case, the finally calculated tool length may be used as the tool length Hb of the working tool T upon the interruption of the machining operation.

Next, the tool wear amount detection means 31 calculates the wear amount Mt of the working tool T from the tool length Ha upon the start of the machining operation and the tool length Hb upon the interruption of the machining operation (step S5). Then, the tool wear amount detection means 31 transmits the calculated wear amount Mt of the working tool T to the wear amount accumulation means 35, which then obtains an accumulated error Me based on the transmitted wear amounts Mt and stores the same together with the relative position of the spindle 15 to the table 17 on the X-axis, Y-axis and Z-axis upon the interruption of the machining operation (step S6). Thus, the relative position of the spindle 15 to the table 17 on the X-axis, Y-axis and Z-axis upon the interruption of the machining operation as well as the deviation amount of the actually machined profile from the desirable machined profile are stored.

As a sequential wear correction carried out at step 7 will be described later, it is assumed in this case that, without carrying out the sequential wear correction at step S7, the procedure proceeds to step S9 at which the worn working tool T mounted to the spindle 15 is replaced with a new one.

After the old working tool T has been replaced and the new one has been mounted to the spindle 15, the tool length Ha upon the start of the machining operation is again calculated, prior to the restart of the machining operation, by the edge position calculation means 27 in a similar manner as step S1 (step S10). After the tool length Ha has been calculated, the machining operation using the new working tool T is restarted (step S1).

The new working tool T is longer by the wear amount Mt than the old working tool T used before the interruption of the machining operation. On the other hand, when the machining operation has been interrupted, the actually machined profile of the workpiece has been shifted by the wear amount Mt of the working tool T from the desirable machined profile toward the spindle 15. Accordingly, upon restarting the machining operation, if the spindle 15 and the table 17 are moved to the same positions as those when the machining operation has been interrupted, the edge of the working tool T mounted to the spindle 15 is located at a position on the desirable machined profile which is closer to the table 17 from the surface of the workpiece of the actually machined profile by the wear amount Mt of the working tool T. As a result, the level difference equal to the wear amount Mt is generated on the surface of the workpiece W.

Figure 3:
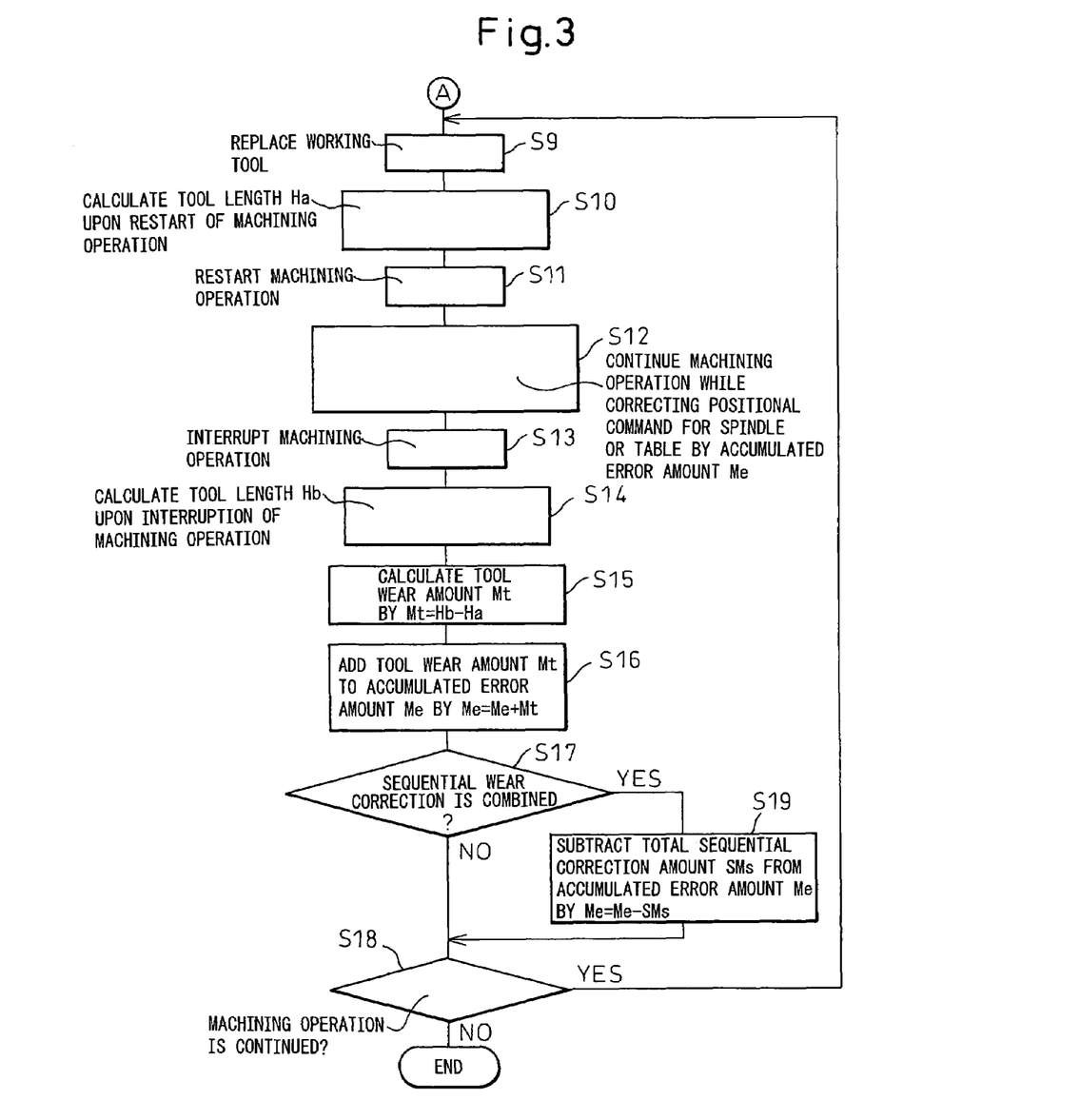
FIG. 3 is a flow chart illustrating the steps of the machining operation subsequent to that shown in FIG. 2.

Accordingly, in the NC machine tool 11 according to the present invention, the tool edge position control means 37 corrects the positional command(s) issued by the positional command generating means 19c to one or both of the spindle 15 and the table 17, and the machining operation is continued while shifting the relative position of the spindle 15 relative to the table 17 away from the table 17 by the accumulated error Me obtained by the edge position control means 37, i.e., at this stage, the wear amount Mt of the working tool T obtained by the tool wear amount detection means 31 (step S12).

Next, in a manner similar to step S3, at a predetermined timing or when the calculated tool length becomes shorter than a predetermined value, the machining operation is interrupted for replacing the worn working tool T with the new working tool T (step S13). Prior to the replacement of the working tool T, the tool length Hb of the worn working tool T due to the machining operation is calculated by the edge position calculation means 27 (step S14), the wear amount Mt of the working tool T used at step S12 is calculated by the tool wear amount detection means 31 in a manner similar to step S5 (step S15), and the accumulated error Me is calculated from the calculated wear amount Mt by the wear amount accumulation means 35 and stored therein (step S16).

As the sequential wear correction carried out at step S17 will be described later, it is assumed that the routine proceeds to step S18 without carrying out the sequential wear correction at step S17. When the machining operation is continued at step S18, steps S9 to S17 are similarly repeated. As the working tool T used at the step S12 is worn as the machining operation progresses in the same manner as in the working tool used at step S2, the deviation of the actually machined profile from the desirable machined profile, when the machining operation has been interrupted for the purpose of replacing the working tool, is equal to a sum of the wear amount Mt of the working tool T used at step S2 and the wear amount Mt of the working tool T used at step S12, i.e. the accumulated error Me obtained by the wear amount accumulation means 35. Accordingly, in the replacement of the working tool T at and after the second time, the machining operation may be continued while the tool edge position control means 37 is correcting the positional command generated by the positional command generating means 19c in accordance with the reference machining program so that the relative position of the spindle 15 relative to the table 17 is shifted by the accumulated error amount Me away from the table 17.

Thus, by carrying out the machining operation using the new working tool T in consideration of the wear amount Mt of the old working tool T, a level difference is prevented from being generated at a position where the working tool T has been replaced, i.e., the machining operation has been interrupted, on the surface of the workpiece of the actually machined profile.

However, although the level difference is eliminated on the actually machined profile if the machining operation is carried out in accordance with the above-mentioned procedure, the actually machined profile deviates from the desirable machined profile. Accordingly, in the NC machine tool 11 according to the present invention, the wear of the working tool T now in use is compensated for by sequentially correcting the relative position of the spindle 15 relative to the table 17 in accordance with steps S21 to S29 illustrated in FIG. 4 during the machining operation carried out at steps S2 to S12. The procedure thereof will be described below in more detail.

Figure 4:
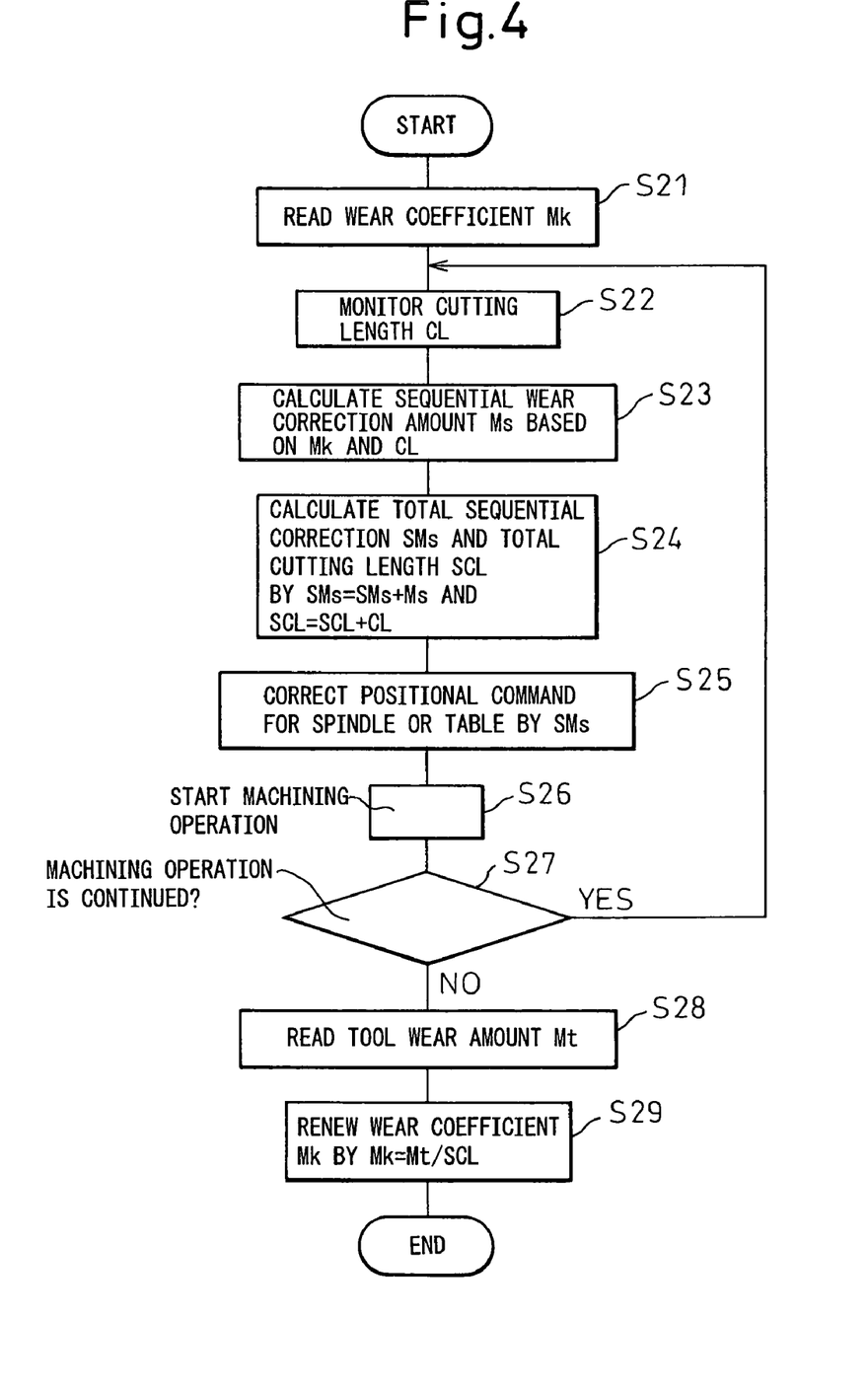
FIG. 4 is a flow chart illustrating the steps of the machining operation carried out in the machine tool shown in FIG. 1 for obtaining the profile of the actually machined workpiece having no deviation from the desirable machined profile.

First, the tool wear amount estimation means 33 reads the predetermined wearing coefficient Mk from a suitable memory means or machining program, etc. (step S21) and thereafter, monitors the cutting length CL (step S22). The cutting length CL may be obtained based on the relative moving distance of the spindle 15 to the table 17 detected by the position-reading means 25 or may be obtained from the respective axial motion commands generated by the axial motion control means 19d.

The tool wear amount estimation means 33 calculates the increment of the wear amount by multiplying the increment of the cutting length CL by the wearing coefficient Mk, to thereby obtain a sequential wearing correction amount Ms, i.e. a correction amount required for the relative position of the spindle 15 and the table 17 to compensate the effect of the wear of the working tool T (step S23). The tool wear amount estimation means 33 calculates a total cutting length SCL and a total sequential correction amount SMs which are the sum of the cutting lengths CL and the sum of the sequential wearing correction amounts Ms, respectively, and transmits them to the tool edge position correction means 34 (step S24).

The tool edge position correction means 34 corrects the positional commands generated for one or both of the spindle 15 or the table 17 by the positional command generating means 19c (step S25), and the machining operation is carried out while shifting the relative position of the spindle 15 toward the table 17 by the total sequential correction amount SMs (step S26).

When the machining operation is continued at step S27, the steps S22 to S26 are repeated.

By sequentially correcting the relative position of the spindle 15 to the table 17 in accordance with the above-mentioned steps, the effect of the wear of the working tool T on the tool edge position of the working tool T is canceled during the machining operation to thereby eliminate or reduce the deviation of the actually machined profile from the desirable machined profile.

At steps S22 to S26, as the wear amount of the working tool T estimated by the tool wear amount estimation means 33 is used, there may be a case where the deviation of the actually machined profile from the desirable machined profile is not completely eliminated. However, if the machining operation is not continued at step S27 and the routine returns to step S3 or S13, the level difference, which would be otherwise generated on the surface of the workpiece of the actually machined profile due to the deviation of the actually machined profile from the desirable machined profile, can be eliminated.

After step S27, the wear amount Mt of the working tool T obtained at step S5 or S15 may be read from the tool wear amount detection means 31 by the wear coefficient correction means 32 (step S28), and divided by the total cutting length SCL to obtain the wearing coefficient Mk based on the actual machining operation (step S29). This makes it possible to obtain the wearing coefficient Mk conforming to the actual machining condition or machining load to thereby reduce the deviation of the actually machined profile from the desirable machined profile.

In an alternative method for estimating the wear amount of the working tool, the wear amount of the working tool may be calculated from the cutting condition, such as a tool rotating speed, a feed speed per tooth, a cutting depth, a tool material, a kind of the working tool and a workpiece material, and/or the machining load.

When the procedure for sequentially correcting the wear of the working tool T shown in FIG. 3 is combined with the procedure for preventing the level difference from being generated on the surface of the workpiece of the actually machined profile shown in FIGS. 2 and 3, it is necessary to partially modify the above-described procedure for preventing the level difference from being generated on the surface of the workpiece of the actually machined profile, as shown at step S8 or S19.

When the wear of the working tool T is sequentially corrected, the deviation of the actually machined profile from the desirable machined profile upon the interruption of the machining operation is smaller by the total sequential correction amount SMs than the wear amount of the used working tool T. Accordingly, at steps S8 and S19, the wear amount accumulation means 35 subtracts the total sequential wearing correction amount SMs from the accumulated error Me representing the deviation of the actually machined profile from the desirable machined profile in order to take the sequential correction component into account.

While the present invention has been described above based on the NC machine tool 11 shown in FIG. 1, the above embodiment is only an example of a method for eliminating or reducing the level difference generated on the surface of the workpiece of the actually machined profile or the deviation of the actually machined profile from the desirable machined profile by taking account of the wear of the working tool T upon the interruption or restart of the machining operation or during the machining operation. Thus, the present invention should not be limited to the above embodiment.

For example, while it has been described in the procedure of steps S1 to S19 that the machining operation is interrupted for the purpose of replacing the working tool T, it may be possible to apply the above-mentioned procedure to a case where the same working tool T is used for machining two different areas of the workpiece W so that after the machining operation in a first area has been once interrupted and a second area has been then machined, the first area is machined again. In such a case, the relative position of the spindle 15 can be shifted toward the table 17 by the difference between the wear amount Mt of the working tool T during the first machining operation in the first area and the wear amount Mt of the working tool T during the machining operation in the second area, to thereby prevent a level difference being generated on the surface of the workpiece of the actually machined profile.

Also, at steps S5 and S15, the tool wear amount estimation means 33 may be used instead of the tool wear amount detection means 31 to accumulate the sequential wear amounts estimated by the tool wear amount estimation means 33 to thereby obtain the total wear amount of the working tool generated during a series of machining operations with the same working tool, which is transmitted to the wear amount accumulation means 35. Also, in this case, as the wear amount is taken into account, the level difference generated on the surface of the workpiece of the actually machined profile between before and after the replacement of the working tool can be at least reduced in comparison with a case where the wear amount is not taken into account.

As described above, according to the present invention, the wear amount of the working tool during the machining operation is estimated or calculated, and the relative position of the spindle to the table is changed upon the interruption or restart of the machining operation for the purpose of the replacement of the working tool or during the machining operation, so that the change in the tool length due to the wear thereof can be canceled. This makes it possible to reduce or eliminate the level difference, which would be otherwise generated on the surface of the workpiece of the actually machined profile, or the deviation of the actually machined profile from the desirable machined profile. Accordingly, a smooth machined profile having a smaller level difference or smaller deviation of the actually machined profile from the desirable machined profile can be obtained without being disturbed by the wear of the working tool.

The invention claimed is:

1. A method for machining a workpiece by moving a working tool and the workpiece relative to each other, said method comprising steps of:
   generating a positional command based on a predetermined NC machining program;
   carrying out the machining operation for the workpiece in accordance with the generated positional command;
   interrupting the machining operation for the workpiece;
   detecting a wear amount of the working tool upon the interruption of the machining operation for the workpiece; and
   correcting a tool edge position of the working tool upon the restart of the machining operation for the workpiece to coincide with the tool edge position of the working tool upon the interruption of the machining operation for the workpiece, based on the detected wear amount of the working tool, and restarting the machining operation for the workpiece from the set tool edge position of the working tool.

2. The method according to claim 1, further comprising a step of accumulating the detected wear amount of the working tool whenever the machining operation for the workpiece is interrupted, wherein said correcting and restarting steps are carried out based on the accumulated wear amount of the working tool.

3. The method according to claim 1, wherein said detecting step comprises steps of measuring a tool edge position of the working tool and calculating the wear amount of the working tool.

4. A method for machining a workpiece by moving a working tool and the workpiece relative to each other, said method comprising steps of:
   generating a positional command based on a predetermined NC machining program;
   carrying out the machining operation for the workpiece in accordance with the generated positional command;
   sequentially estimating a wear amount of the working tool during the machining of the workpiece;
   sequentially correcting the tool edge position of the working tool so as to compensate for the estimated wear amount of the working tool;
   interrupting the machining operation for the workpiece;
   detecting the wear amount of the working tool upon the interruption of the machining operation for the workpiece:
   accumulating a difference between the detected wear amount of the working tool and the estimated wear amount of the working tool; and
   correcting a tool edge position of the working tool upon the restart of the machining operation to coincide with the tool edge position of the working tool upon the interruption of the machining operation for the workpiece, based on the accumulated wear amount of the working tool, and restarting the machining operation for the workpiece from the set tool edge position of the working tool.

5. The method according to claim 4, wherein said detecting step comprises steps of measuring a tool edge position of the working tool and calculating the wear amount of the working tool.

6. The method according to claim 4, wherein said estimating step comprises a step of estimating a wear amount of the working tool from a cuffing length and a predetermined wear amount per unit cuffing length.

7. The method according to claim 4, wherein said estimating step comprises a step of estimating the wear amount from one or both of a cutting condition and a machining load.

8. The method according to claim 4, wherein said estimating step comprises a step of estimating the wear amount from a cuffing length and a predetermined wear amount per unit cutting length as well as one or both of a cuffing condition and a machining load.

9. The method according to claim 4, wherein said estimating step comprises steps of measuring the tool edge position of the working tool, calculating the wear amount of the working tool, comparing the calculated wear amount of the working tool with the estimated wear amount of the working tool, and sequentially correcting the wear amount per unit cutting length used for the estimation so that the calculated wear amount and the estimated wear amount coincide with each other.

10. A machine tool for machining a workpiece by moving a working tool and the workpiece relative to each other, said machine tool having a function for correcting the wear of the working tool, said machine tool comprising:
 a positional command generating means for generating a positional command based on a predetermined NC machining program and moving the working tool and the workpiece relative to each other in accordance with the generated positional command;
 a tool wear amount detection means for detecting a wear amount of the working tool upon the interruption of the machining operation for the workpiece; and
 a tool edge position control means for correcting a tool edge position of the working tool upon the restart of the machining operation for the workpiece to coincide with the tool edge position of the working tool upon the interruption of the machining operation for the workpiece, based on the wear amount of the working tool detected by said tool wear amount detection means.

11. The machine tool according to claim 10, further comprising a wear amount accumulation means for accumulating the wear amount of the working tool detected by said tool wear amount detection means whenever the machining operation for the workpiece is interrupted, wherein said tool edge position control means corrects the tool edge position of the working tool upon the restart of the machining operation for the workpiece to coincide with the tool edge position of the working tool upon the interruption of the machining operation for the workpiece, based on the accumulated wear amount of the working tool calculated by said wear amount accumulation means, and restarts the machining operation for the workpiece from the set tool edge position of the working tool.

12. A machine tool for machining a workpiece by moving a working tool and the workpiece relative to each other, said machine tool having a function for correcting the wear of the working tool, said machine tool comprising:
 a positional command generating means for generating a positional command based on a predetermined NC machining program and moving the working tool and the workpiece relative to each other in accordance with the generated positional command;
 a tool wear amount detection means for detecting a wear amount of the working tool upon the interruption of the maching operation for the workpiece;
 a tool wear amount estimation means for sequentially estimating a wear amount of the working tool during the machining of the workpiece:
 a tool edge position correction means for sequentially correcting the tool edge position of the working tool so as to compensate for the wear amount of the working tool estimated by said tool wear amount estimation means;
 a wear amount accumulation means for accumulating a difference between the detected wear amount of the working tool and the estimated wear amount of the working tool; and
 a tool edge position control means for correcting a tool edge position of the working tool upon the restart of the machining operation for the workpiece to coincide with the tool edge position of the work tool upon the interruption of the machining operation for the workpiece, based on the accumulated wear amount of the working tool.

13. The machine tool according to claim 12, further comprising a wear coefficient correction means for comparing the wear amount of the working tool detected by said tool wear amount detection means with the wear amount of the working tool estimated by said tool wear amount estimation means and sequentially correcting a wear amount per unit cuffing length used for the estimation so that the detected wear amount and the estimated wear amount coincide with each other.

* * * * *